United States Patent [19]
Beck

[11] Patent Number: 6,030,308
[45] Date of Patent: Feb. 29, 2000

[54] ADJUSTABLE ENDLESS BELT FOR USE IN POWER TRANSMISSION AND APPARATUS AND METHODS FOR FORMING BELT

[76] Inventor: Paul Beck, 21660 Pacific Coast, Malibu, Calif. 90265

[21] Appl. No.: 09/128,705

[22] Filed: Aug. 4, 1998

Related U.S. Application Data

[63] Continuation-in-part of application No. 08/863,392, May 27, 1997, Pat. No. 5,788,595, which is a continuation-in-part of application No. 08/574,845, Dec. 19, 1995, Pat. No. 5,632,700.

[51] Int. Cl.[7] ............................................. F16G 3/10
[52] U.S. Cl. .......................... 474/254; 474/264; 474/268
[58] Field of Search .................................... 474/253, 254, 474/264, 268; 156/502

[56] References Cited

U.S. PATENT DOCUMENTS

| | | | |
|---|---|---|---|
| Re. 33,389 | 10/1990 | Beck | 474/253 |
| 4,637,810 | 1/1987 | Beck | 474/253 |
| 5,129,866 | 7/1992 | Schanin et al. | 474/264 |
| 5,176,583 | 1/1993 | Schanin et al. | 474/166 |

*Primary Examiner*—Roger Schoeppel
*Attorney, Agent, or Firm*—Lyon & Lyon LLP

[57] ABSTRACT

An endless belt particularly adapted for use in high speed power transmission, commonly termed a fan belt, which is particularly adapted to be readily formed on site to any desired length and methods and apparatus for forming the belt. The belt is comprised of an outer length of flexible tear-resistant material having abutting ends so as to form a closed loop and defining an endless channel extending longitudinally therethrough. An inelastic ribbon of flexible tear-resistant material is disposed within the channel and extends about the loop defined by the outer length of material such that the ribbon extends across the abutting ends of the outer length of material and the ends of the reinforcing ribbon are in an abutting relationship within the channel at a location substantially diametrically opposed across the formed loop from the abutting ends of the outer length of material. An adhesive is disposed within the channel about the reinforcing ribbon securing the ribbon to the outer length of material so as to maintain the outer length of material in a closed loop configuration of predetermined size.

16 Claims, 10 Drawing Sheets

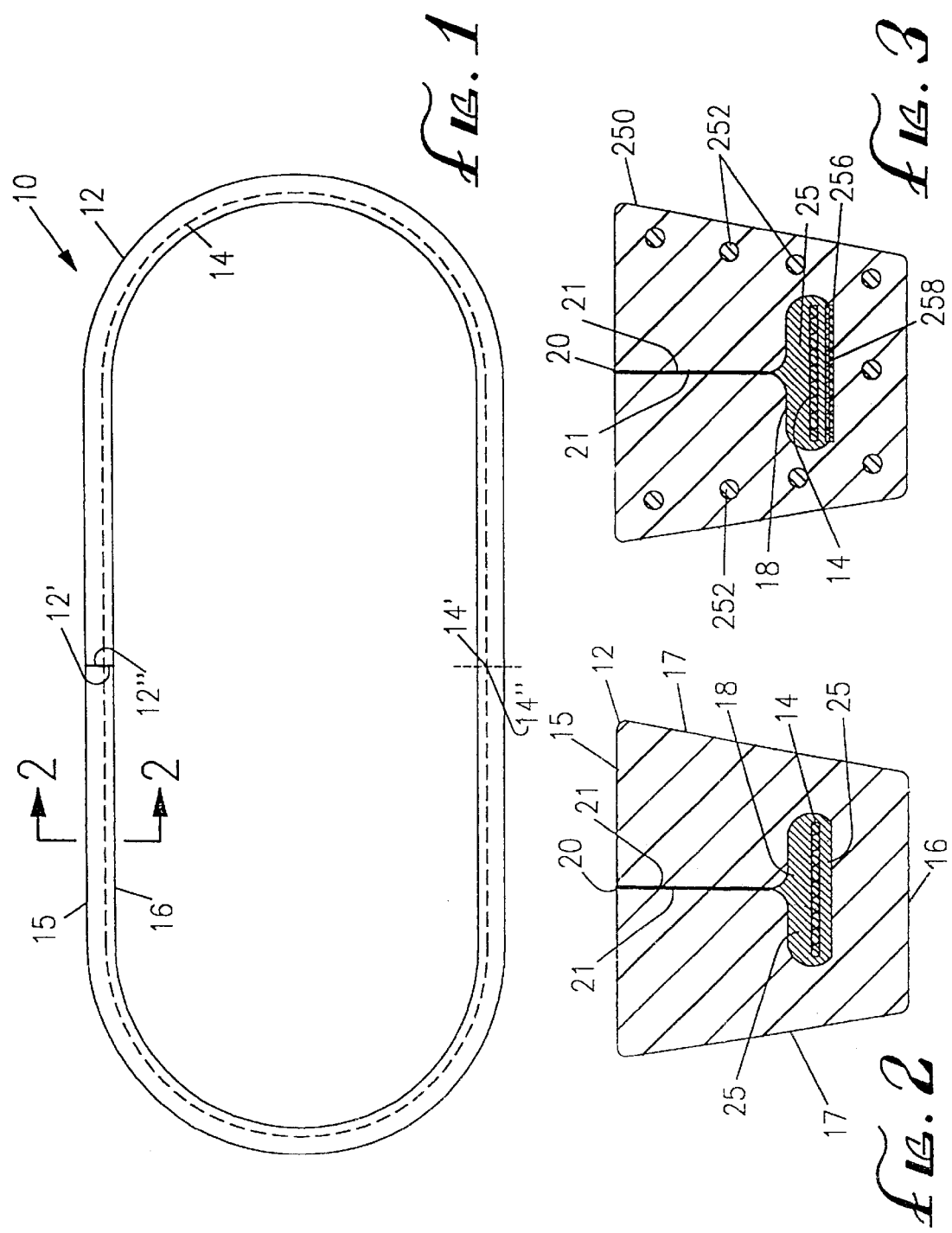

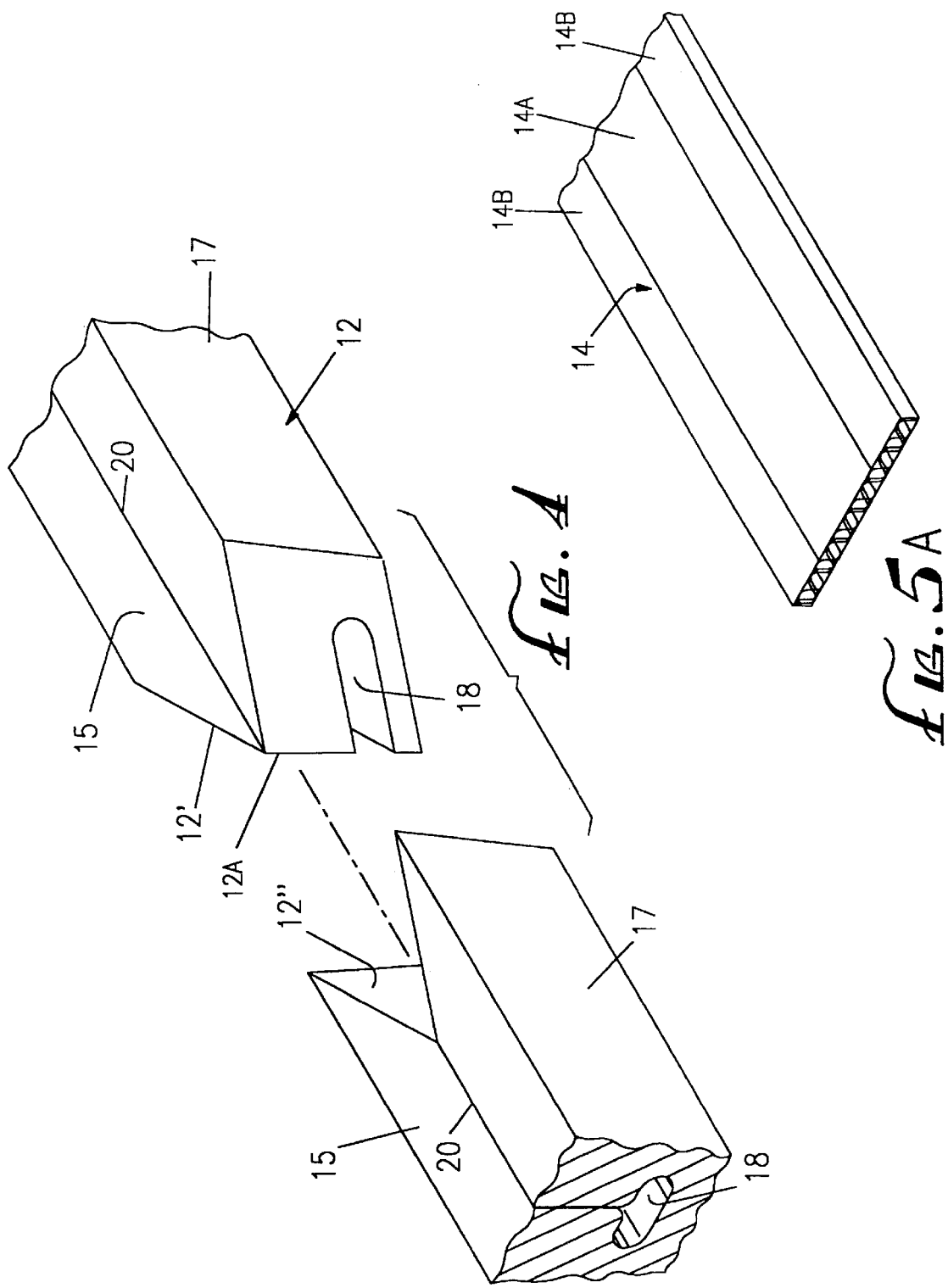

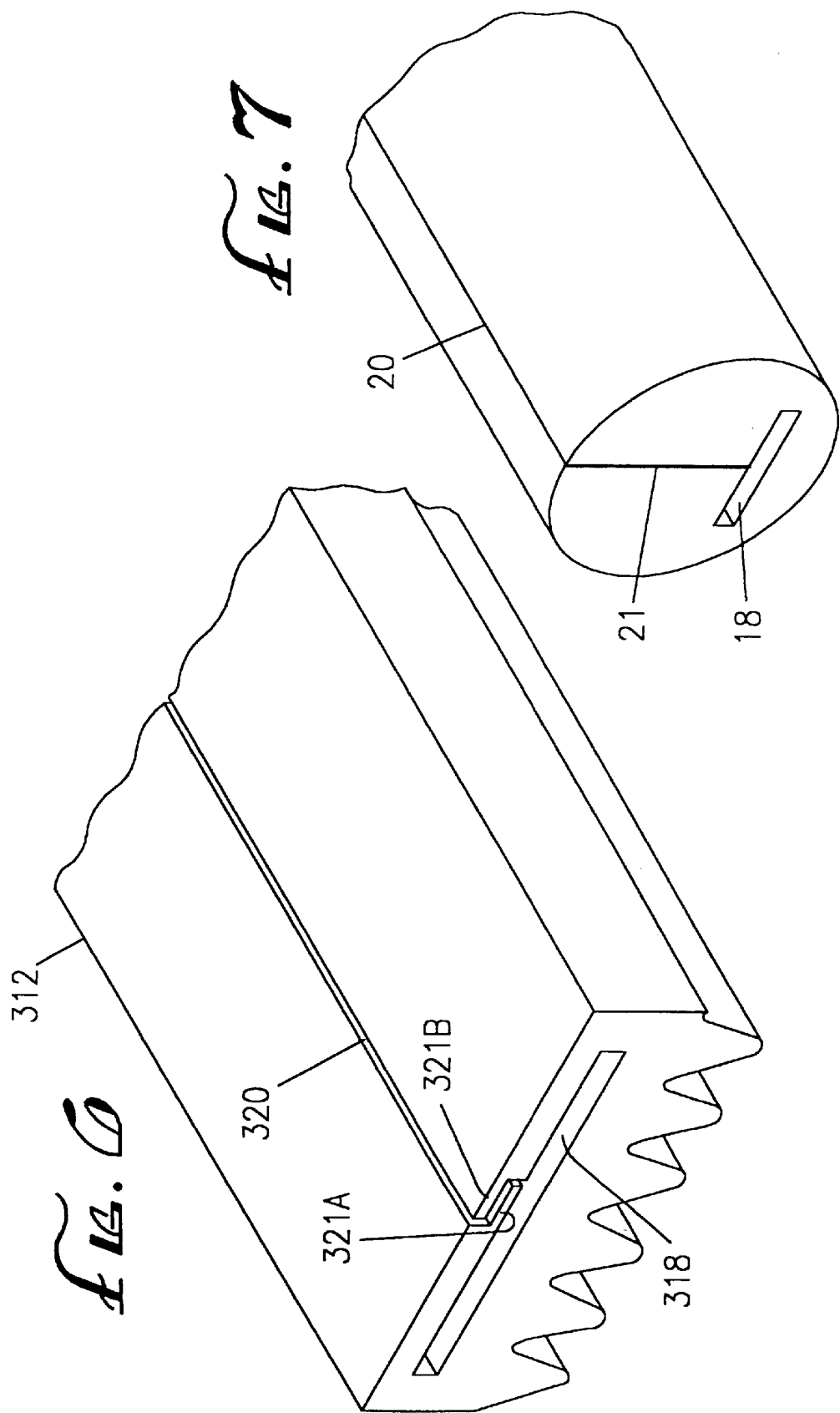

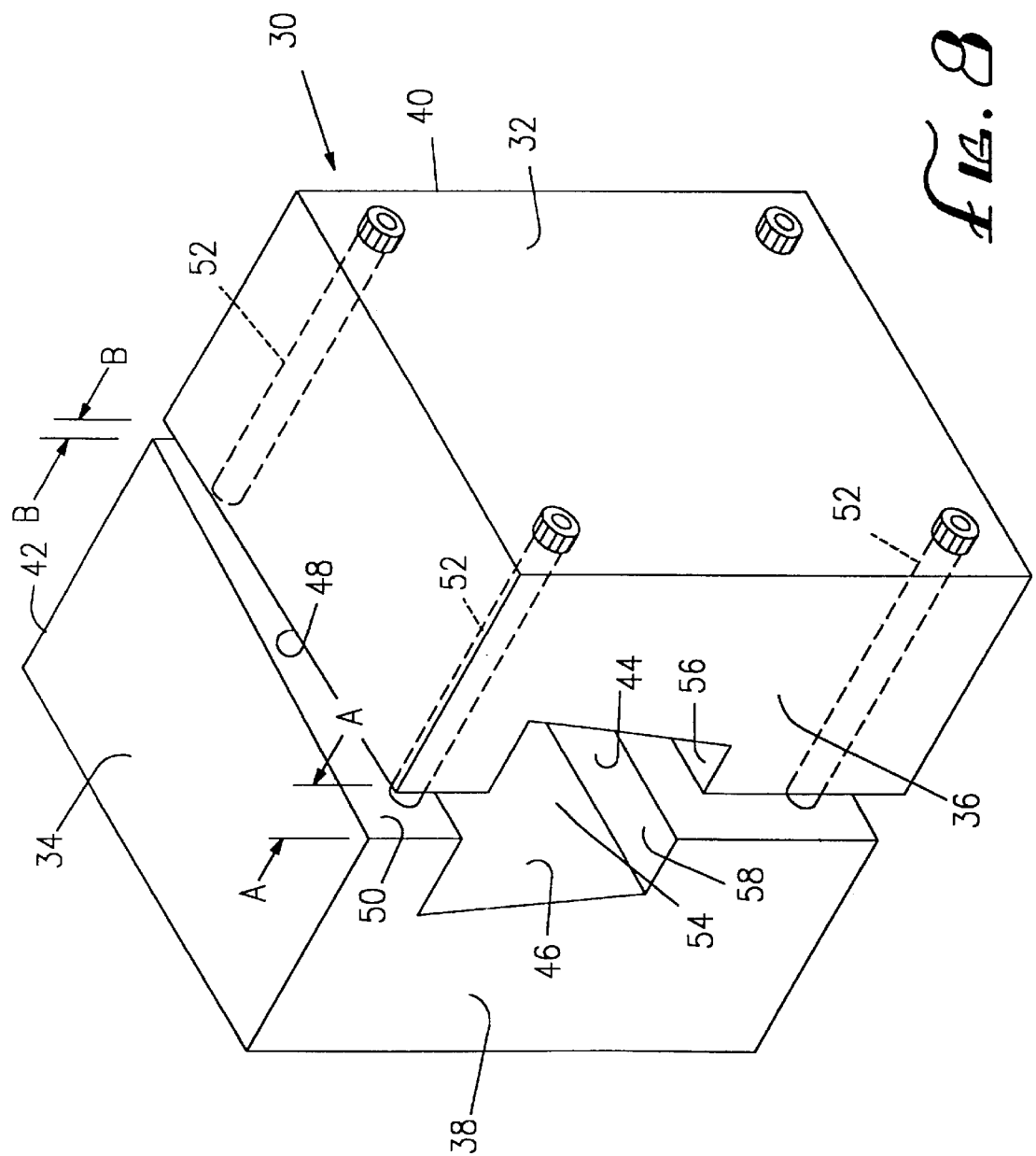

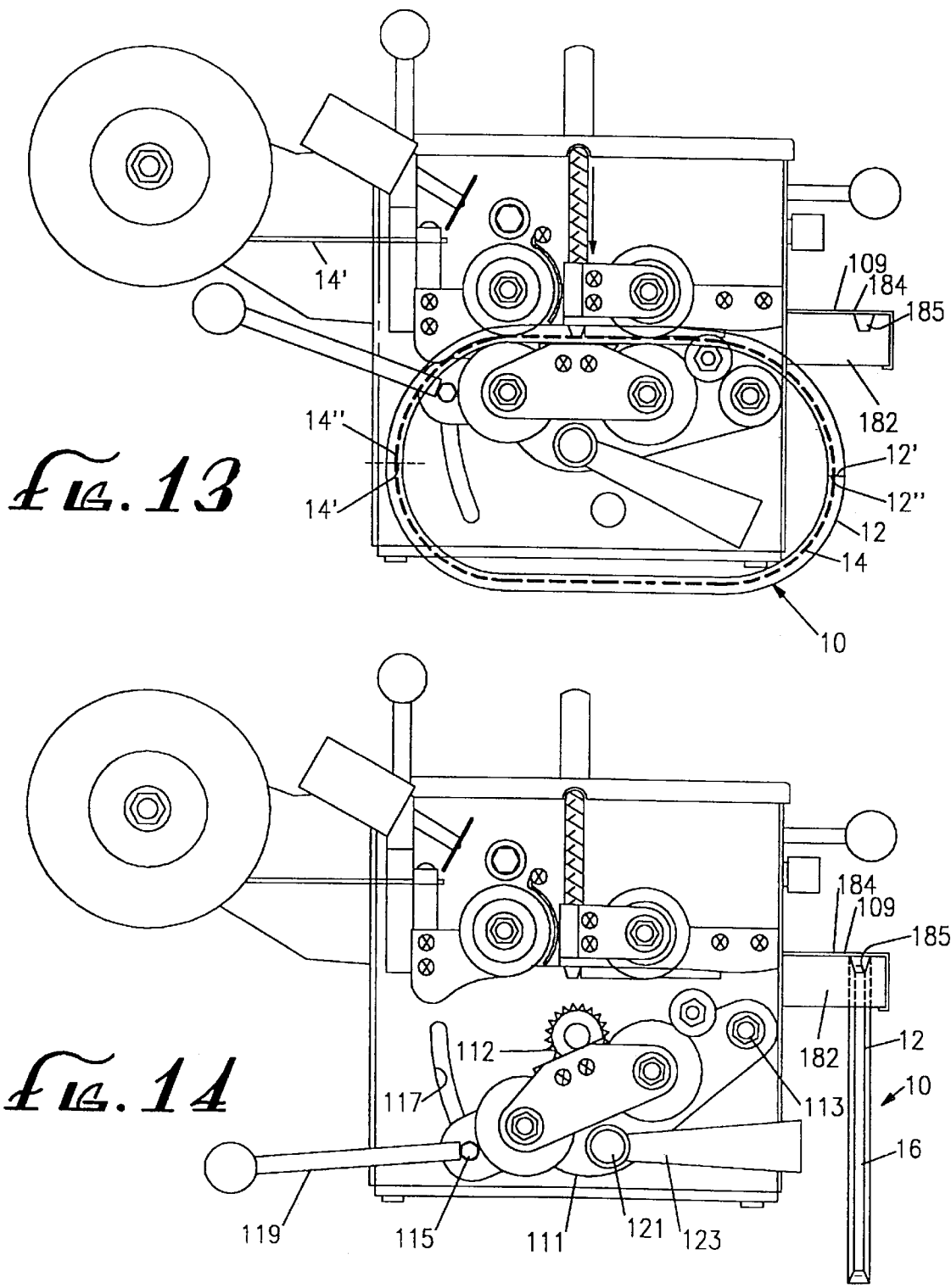

ADJUSTABLE ENDLESS BELT FOR USE IN POWER TRANSMISSION AND APPARATUS AND METHODS FOR FORMING BELT

This is a continuation-in-part of application Ser. No. 08/863,392 filed on May 27, 1997, now U.S. Pat. No. 5,788,595 which is a continuation in and part of Ser. No. 08/574,845 filed on Dec. 19, 1995, now U.S. Pat. No. 5,632,700 which is a continuation of United States Letters Pat. No. 5,484,342, issued Jan. 16, 1996.

BACKGROUND OF THE INVENTION

The endless belts used for moderate load power transmission applications in automobiles, which are more commonly collectively termed fan belts, are constructed of a flexible, tear-resistant polymeric material and are manufactured in countless different sizes to accommodate the varying pulley sizes and spacings therebetween found in the vast number of different models of automobiles sold and driven in the United States and foreign countries. While these endless belts are quite durable, they nevertheless are subjected to a great deal of stress due to their high speed operation and consequently must be periodically replaced. Thus, for a garage to be able to meet the needs of its customers, it is necessary to stock a large number of differently sized belts. This presents a substantial inventory problem to the garage as these belts are of a fixed size and consequently a belt suitable for one make of automobile cannot generally be used in another.

In addition to having to stock a large inventory of these belts, a garage mechanic must often expend a good deal of labor in securing the belt about the pulleys due to the limited flexibility inherent in such belts and the often encountered awkward positioning of the pulleys with respect to the automobile body presenting the mechanic with restricted access for mounting the belt on the pulleys.

The problems of fixed belt size and installation could be greatly relieved if the belt were either adjustable or of a construction whereby it could be readily assembled on site to the desired size for a particular application, e.g., in an auto repair garage by an auto repair person for a particular model of automobile. One solution to the problems of fixed belt size and installation is found in applicant's U.S. Pat. No. 4,031,766 wherein an adjustable belt is provided which can be assembled about the pulleys and thereby facilitate installation while obviating the need for an inventory of differently sized belts. That solution employs a belt having a male end of reduced diameter and a female end having a channel therein equal in length to the reduced diameter portion of the male end. To define a belt having the desired size, equal precalculated lengths are severed from both the male and female ends, and an adhesive is applied about the male end which is then inserted into the female end of the belt. To avoid any gaps which would otherwise weaken and imbalance the belt, these cuttings have to be carefully made to insure that the length of the reduced diameter portion of the male end is equal to the length of the channel in the female end.

An improvement to the above-described patented belt configuration is disclosed in applicant's U.S. Pat. No. Re. 33,389. In the improved structure, an outer length of flexible and durable belt material is provided with a centrally disposed channel extending therethrough and a flexible and durable cord is slidably disposed within the channel and extends the length thereof. An endless belt of the desired size is formed by cutting the length of belt material with the reinforcing cord contained therein to the desired length, pulling a portion of the cord from one end of the outer length of belt material and applying an adhesive to the exposed cord and the ends of the belt material. The exposed portion of the reinforcing cord is then inserted into the open channel in the other end of the outer length of belt material until the ends of the outer length of material are in an abutting relationship. As the reinforcing cord is of the same length as the outer length of material, the ends of the reinforcing cord will also be in an abutting relationship within the outer length of material. Upon setting of the adhesive, a durable endless belt of the desired size is formed. While such a belt construction and forming process retains the ease of installation and adjustability of the earlier patented construction, it eliminated the need for having to make to precise cuts during the belt forming process and provides the resultant belt with superior strength characteristics. However, it has been found that such a construction is relatively expensive due to the costs of forming a cylindrical longitudinal channel in the outer belt length.

A further improvement to the above-described belts and their methods of manufacture is found applicant's copending application Ser. No. 08/574,845. The further improved configuration comprises an outer length of flexible, tear-resistant material defining parallel inner and outer surfaces formed into a closed loop of desired size. The outer length of material has a generally rectangular interior channel therein extending about the loop proximate the inner surface thereof. A reinforcing ribbon of tear-resistant, flexible material is disposed within the channel and extends about the loop, traversing the abutting ends of the outer length of material and overlapping itself within the interior channel. An adhesive is provided within the interior channel for securing the reinforcing ribbon therein to the interior of the outer length of material and for securing together the overlapping portions of the reinforcing ribbon within the channel thereby providing a strong and durable transmission belt.

The aforesaid endless belt was adapted to be formed on site into any desired length either manually or automatically with a belt forming apparatus. This was achieved by providing the outer length of belt material with a longitudinally extending radial slit in the outer surface of the length of belt material which communicated with the interiorly disposed channel. The outer length of belt material was first cut to the desired length such that the extended ends thereof defined acutely angled mating surfaces. In the preferred process for forming the belt, the adhesive and reinforcing ribbon were concurrently fed into the interior channel in the outer length of belt material through the radial slit therein as the outer length of belt material was formed into a closed loop. The ribbon and adhesive continued to be fed into the channel after the leading end of the outer length of belt material was brought into abutment with the trailing end to form the endless loop such that the reinforcing ribbon and adhesive extended across the abutting ends of the outer length of belt material and about the loop defined thereby as above described. The ribbon was then severed such that a short length thereof projected radially from the interior channel through the slit in the belt material. The protruding ribbon was then pressed into the channel through the slit over the previously inserted adhesive and ribbon. The abutting ends of outer length of belt material were then clamped together in a mating relationship as the adhesive quickly set, completing the belt forming process.

This embodiment of the belt and method of construction retained the strength characteristics of the previously discussed earlier embodiments and significantly reduced the cost of construction. However, in many of these belts, particularly in the longer sizes, work hardening was found in the cured adhesive. Because the adhesive layers within the belt were relatively thin, such a condition could lead to failure after extended periods of use. The work hardening of the adhesive was found to have resulted from high frequency vibration in the belt during use. The vibration was found to be caused by a combination of natural resonance during high speed use, the higher coefficient of friction exhibited by the polyurethane belt material and slight imbalances in the belts.

Some natural vibration in the belt during high speed use is unavoidable. The higher coefficient of friction in the belt material caused the belt to tend to "hug" the pulley during use as opposed to extending tangentially therefrom as occurs with conventional neoprene belts. As a result the belt came off the pulley at outwardly inclined angles which caused the belt to vibrate. This higher coefficient of friction, however, also allowed the belt to be more loosely secured about the pulleys than conventional neoprene belts, reducing the radial forces exerted on the shafts and thus prolonging the life of the bearings and associated motors such as the water pump. Thus, the potential benefits resulting from use of the polyurethane material weighed against the use of neoprene or other material having a lower coefficient of friction in an effort to solve the vibration problem. The slight imbalance in these belts, which also contributed to the vibration, was caused in part by the overlapping portion of the ribbon within the belt and, in part, by non-uniformities in the extruded outer length of belt material. The overlap of the reinforcing ribbon within the outer length of belt material was deemed necessary due to the difficulties encountered in securely adhering the ribbon to the polyurethane. The ribbon to ribbon securement was considerably stronger.

The endless belts and forming processes disclosed herein retain all of the advantages of the above-discussed prior embodiments while substantially diminishing the deleterious effects of work hardening in the cured adhesive, thereby significantly improving the useful life of the belt.

SUMMARY OF THE INVENTION

Briefly, the present invention relates to an endless belt for power transmission and methods and apparatus for readily forming the belt on site in any desired length. The belt of the present invention is comprised of an outer length of flexible, tear-resistant belt material, uniform in cross-section and formed into a closed loop of a desired size. The outer length of belt material has a generally rectangular interior channel therein extending about the formed loop proximate the inner surface thereof. A thin, inelastic reinforcing ribbon comprising strong, tear-resistant, flexible fibers is disposed within the channel and extends entirely about the closed loop with the ends of the ribbon being in an abutting disposition at a location substantially opposite the abutting ends of the outer length of belt material. An adhesive is provided within the interior channel about the ribbon for, securing the reinforcing ribbon to the interior of the outer length of belt material, thereby providing an exceptionally strong and highly durable power transmission belt.

The reinforcing ribbon preferably employed in the present invention is of a thin woven or braided construction which allows the ribbon to be formed of the fibers necessary to provide the ribbon with its desired physical characteristics and allows the adhesive to wrap about and form a mechanical bond with the ribbon in addition to a chemical bond and thereby form a stronger bond between the ribbon and outer length of belt material. As a result, only a thin uniform layer of ribbon needs to be employed to hold the belt in its endless loop configuration. Providing a uniform layer of reinforcing ribbon throughout the entire length of the belt, improves the balance of the belt. Utilizing a layer of reinforcing ribbon which, while quite strong, is also very thin, allows the thickness of the adhesive about the ribbon to be increased without having to enlarge the size of the interior channel and weaken the belt. Employing a thicker layer of adhesive significantly diminishes the adverse effects of any work hardening in the adhesive resulting from vibration. The combination of reduced vibration and a more durable layer of adhesive provides a substantial improvement in the durability of the belt of the present invention.

In an alternate and preferred configuration of the invention, two wraps of reinforcing ribbon are disposed within the channel and extend about the closed loop formed by the outer length of material. The adhesive employed in this configuration exhibits in excess of three hundred percent elongation so that upon curing, the relatively thin layers of adhesive will remain sufficiently flexible to avoid work hardening.

The ends of the ribbon are again disposed in an adjacent disposition within the outer length of belt material at a location substantially opposite the abutting ends of the outer length of material.

The endless belt of the present invention is particularly adapted to be formed on site into any desired length either manually or automatically with a belt-forming apparatus. This is achieved by providing the outer length of belt material with a longitudinally extending radial slit in the outer surface of the length of belt material which communicates with the interiorly disposed channel. The outer length of belt material is first cut to the desired length such that the extended ends thereof define acutely angled mating surfaces. In the preferred process for forming the belt, the adhesive and reinforcing ribbon are concurrently fed into the interior channel in the outer length of belt material through a radial slit therein beginning at the midpoint of the outer length of belt material. From the midpoint, the adhesive and reinforcing ribbon continue to be fed into the interior channel in the outer length of belt material through the radial slit therein as the outer length of material is formed into a closed loop. The ribbon and adhesive continue to be fed into the channel after the leading end of the outer length of belt material is brought into abutment with the trailing end to form the endless loop such that the reinforcing ribbon extends across the abutting ends of the belt material and longitudinally about and within the outer length of material as above described. The ribbon is then severed such that a short length thereof projects radially from the interior channel through the slit in the belt material. The protruding ribbon is then pressed into the channel in a flat disposition through the slit whereupon the extended ends of the ribbon abut each other at a location diametrically across the formed loop from the extruded ends of the outer length of belt material. The opposed disposition of the abutting ends of the reinforcing ribbon and the abutting ends of the outer length of material better balances the finished belt. Any remaining wrinkles in the ribbon are then laid flat and the area in the channel above the ribbon is preferably filled with adhesive so as to encapsulate the ribbon within the outer length of material. The abutting ends of belt material are then clamped together in a matting relationship as the adhesive quickly sets, completing the belt forming process.

The process for forming the preferred dual wrap configuration of the belt is substantially the same as the single wrap except that the reinforcing ribbon and adhesive continue to be fed into the channel for an additional loop about the outer length of material so as to form two wraps of reinforcing ribbon within the formed belt with an additional thin layer of adhesive disposed therebetween. In forming the dual wrap configuration, it has been found preferable to insert a leading edge portion of the ribbon of about one inch in length in the channel in a dry condition and to press the leading edge portion flat against the channel floor to ensure a smooth end portion. Thereafter, the ribbon is fed onto a thin layer of adhesive which is disposed over the channel floor immediately prior to the ribbon being pressed onto the adhesive as above-described in the manufacture of a belt having a single wrap of reinforcing ribbon therein.

It is the principal object of the present invention to provide an endless belt for power transmission which can be readily formed into any desired length and which is very durable and economical to manufacture.

It is another object of the present invention to provide improved methods and apparatus which can be readily employed on site to form a very durable endless belt for power transmission in any desired length.

Other objects and advantages of the present invention will become readily apparent from the following detailed description taken in conjunction with the accompanying drawings.

DESCRIPTION OF THE PREFERRED
EMBODIMENTS IN THE DRAWINGS

FIG. 1 is a side view of the endless belt of the present invention.

FIG. 2 is a sectional view taken along the line 2—2 of FIG. 1.

FIG. 3 is a sectional view of an alternate embodiment of the endless belt of the present invention.

FIG. 4 is an enlarged perspective view showing the mating ends of the outer length of belt material.

FIG. 5A is an enlarged perspective view of a portion of a length of dual fiber reinforcing ribbon.

FIG. 6 is a perspective view of a portion of the outer length of belt material employed in the formation of a v-ribbed belt.

FIG. 7 is a perspective view of a portion of the outer length of belt material employed in the formation of a fractional belt.

FIG. 8 is a perspective view of the post-die guide used in the formation of the outer length of belt material.

FIGS. 9–14 are side views of a belt forming apparatus of the present invention illustrating the sequential steps of forming the belt with the apparatus. Portions of the outer length of belt material are illustrated therein as though the material were transparent for clarity and so as not to obstruct the view of the elements projecting into the belt material during formation of the endless belt.

Figure 5D:
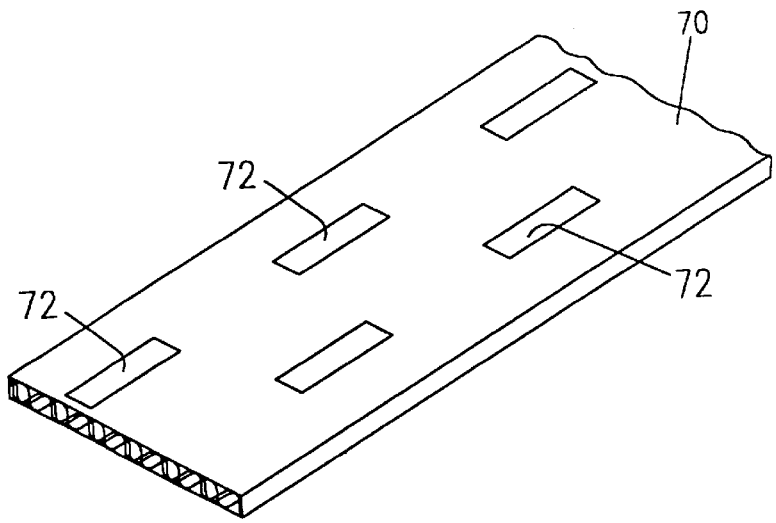
FIG. 5D is an enlarged perspective view of a portion of reinforcing ribbon employed in the belt embodiment of FIG. 5C.

Referring now in detail to the drawings, the endless belt 10 of the present invention is comprised of an outer length of flexible tear-resistant belt material 12 and a length of reinforcing ribbon 14. The outer length of belt material 12 is preferably formed of an extruded semi-rigid polymeric material such as thermoplastic polyurethane having no added slip or release agents which would inhibit bondability with the reinforcing ribbon 14. A polyester-based material marketed by BASF Corporation under the designation Elastollan SP 806-50 has proved highly suitable for use in forming the outer belt length 12. Because the outer belt material does not contain mold release agents, the extrusion die (not shown) is impregnated with Teflon to prevent sticking.

For a conventional fan belt configuration, the outer length of belt material 12 defines parallel outer and inner surfaces 15 and 16, oppositely inclined sidewalls 17 and has a longitudinal generally rectangular channel 18 extending therethrough in which the reinforcing ribbon 14 is disposed. To prevent the belt from inverting during formation or use, channel 18 is spaced within the outer length 12 closer to the inner surface 16 thereof than the outer surface 14. Preferably, the upper end of channel 18 is disposed about midway between surfaces 15 and 16 so as to at least substantially dispose channel 18 in the inner half of the formed belt as seen in FIGS. 2–4.

A very thin slit 20 is provided in the outer length of material 12 which extends throughout the length thereof perpendicularly from the outer belt surface 15 to channel 18 so that the reinforcing ribbon 14 can be readily inserted therethrough into channel 18 as will be described. The upper surface of channel 18 is preferably radiused adjacent slit 20 to provide additional space in the upper portion of channel 18 to accommodate an adhesive 25 for securement of the reinforcing ribbon therein and to facilitate entry of the reinforcing ribbon into the channel 18 through slit 20. Slit 20 is formed so that the adjacent vertical wall portions 21 about slit 20 are preferably in an abutting disposition with no air gap therebetween.

To improve the cross-sectional uniformity of the outer length of belt material 12 and thereby improve the balance of the completed belt 10, a post die guide 30 is preferably employed in the otherwise conventional extrusion process used to form the outer belt length 12. Guide 30 is illustrated in FIG. 8 and comprises a pair of blocks 32 and 34 defining forward ends 36 and 38, rearward ends 40 and 42 and mating cavities 44 and 46 formed in their inwardly facing sides 48 and 50 of the guide blocks. The blocks 32 and 34 are secured together by a plurality of elongated threaded fastening members 52 extending therebetween. Cavities 44 and 46 are configured to cooperate to conform with the configuration of convention fan belts. By adjusting the fastening members 52 to vary the lateral spacing between the two blocks, the width of the opening 54 defined by cavities 44 and 46 can be adjusted so that guide 30 can be used in the formation of belts of different widths.

For a fan belt measuring about 7/16 of an inch across at the upper or outer surface, the spacing between the forward ends 36 and 38 of the guide blocks is about 1/8 of an inch wider than the spacing between the rear ends of blocks. This spacing differential is illustrated by arrows A—A and B—B in FIG. 8. By virtue of the spacing differential, a tapering of the opening 54 through the post die guide 30 is provided to facilitate passage of the extruding outer length of material 12 through the guide.

In use, guide 30 is disposed proximate the upstream end of the quench bath (not shown) such that the freshly extruded polyurethane material passes horizontally through opening 54 shortly after entering the quench bath. By way of example, in a horizontal extrusion process employing a quench bath of about 30 feet in length and 6 inches in depth, guide 30 is positioned in the bath such that opening 54 is disposed in a horizontal disposition about 3 inches below the surface of the bath and about eight inches from the point that the freshly extruded polyurethane material enters the bath. As the freshly extruded polyurethane begins to crystallize and passes through guide 30, the sides of opening 54 function as a sizing guide and provide the formed outer length of material 12 with a more uniform cross-section, thereby improving the balance of the belt.

While the outer length of material 12 is being formed, the slit 21 communicating the upper surface of the outer length 12 with channel 18 is relatively open as it passes through guide 30. The height of cavities 44 and 46 is greater than the height of the outer lengths of material to be sized by guide 30 so that the bottom surfaces 56 and 58 of cavities 44 and 46 do not contact the underside of the crystallizing outer length of material as it passes therethrough. As a result, no scarring occurs in length 12 by virtue of the spacing between the blocks adjacent the upper and lower ends of the cavities 44 and 46 therein.

The reinforcing ribbon 14 should be quite strong and highly resistant to stretching to maintain the outer length of material 12 in a closed loop configuration of predetermined size. The ribbon 14 must also be flexible, not overly abrasive so as not to tear the outer length of material during use, and it should be relatively thin to provide more room for adhesive about the ribbon in channel 18. Increasing the thickness of the adhesive within channel 18 will reduce the adverse effects of any work hardening which might occur in the adhesive during use. Increasing the size of channel 18 to accommodate additional adhesive could weaken the structural integrity of the outer length of material 12. Finally, ribbon 14 should be receptive to an adhesive so that a strong bond can be formed between the ribbon and the outer length of material to maintain the outer length of material in its closed loop configuration of predetermined size.

Because the materials having the desired strength and durability characteristics are not readily susceptible to being bonded to polyurethane, even polyurethane without the mold release agents, a composite ribbon has been developed for reinforcing the outer length of material 12 and maintaining the belt 10 in a closed configuration of predetermined size. One configuration of reinforcing ribbon 14 employed in the present invention comprises a pre-stretched Cartesian weave of two different fibers. one fiber provides the ribbon with its durability and strength requirements. The second cooperates with the adhesive to secure the ribbon to the outer length of polyurethane material. The woven configuration of the ribbon also allows the adhesive to better permeate the ribbon. A second and improved configuration of reinforcing ribbon is of a braided configuration wherein the strengthening fibers which do not readily adhere to the adhesive are entirely encased in the adhesive absorbing fibers. Such a ribbon configuration is discussed later herein.

An example of a woven dual fiber reinforcing ribbon developed for use in the present invention is seen in FIG. 5A. The central portion 14A of the ribbon 14 illustrated therein is formed of aramid fibers, such as those marketed by E.I. Du Pont De Nemours & Co. under the trademark Kevlar. The Kevlar fibers are bordered by lateral portions 14B formed of fiberglass (Eglass) fibers. The Kevlar fibers provide the ribbon 14 with its necessary strength and resistance to stretching but is highly abrasive and will not bond well with adhesives. The adjacent fiberglass fibers protect the interior of the outer length of belt material 12 from the abrasive edges of the Kevlar and absorb the adhesive far better than the Kevlar fibers. The woven construction of the fiberglass borders on ribbon 14 also allows the adhesive to permeate and better grip the ribbon and thereby form a very strong bond with the outer belt material 12 to provide belt 10 with superior structural integrity.

Figure 5B:
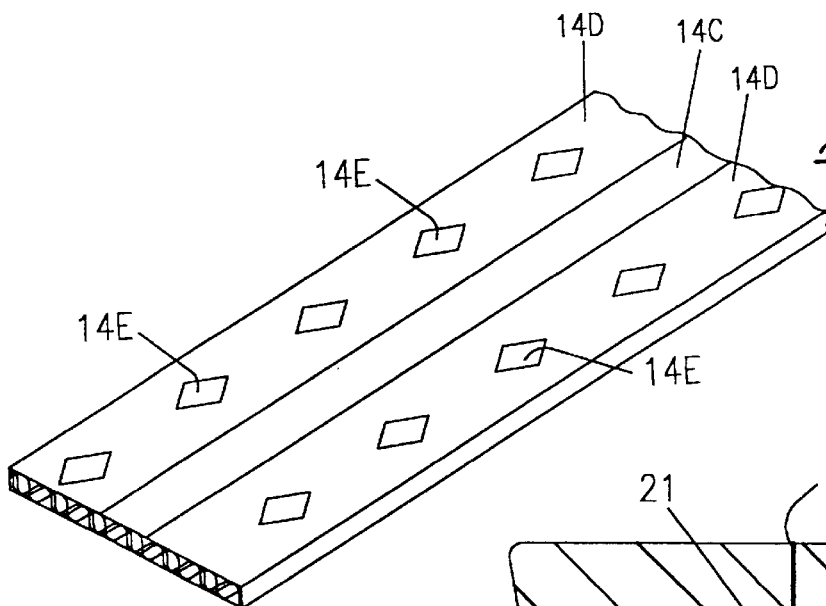
FIG. 5B is an enlarged perspective view of a modified embodiment of a length of dual fiber reinforcing ribbon.

Another example of a woven dual fiber reinforcing ribbon is illustrated in FIG. 5B. As seen therein, the ribbon includes a central Kevlar portion 14C bordered by prestretched Dacron portions 14D. A plurality of staggered openings or through-holes 14E are woven into the Dacron portions to allow the adhesive to form a mechanical bonding with the ribbon and thereby improve the adhesive of the ribbon 14 to the outer belt length 12. Kevlar portion 14C is shown in FIG. 5B as being narrower in width than portion 14A in the prior embodiment of ribbon 14. The wider the Kevlar portion, the greater the strength of the reinforcing ribbon and the greater the cost of construction. The width of the Kevlar or strength enhancing portion of the ribbon relative to the lateral portions shown in FIG. 5B would provide more than adequate strength for any conventional application. Other materials having the desired physical characteristics could also be employed in the formation of a reinforcing ribbon for use in the present invention. In such ribbons, and in the Kevlar/fiberglass ribbon discussed above, the above-described through-holes, such as those shown at 72 in FIG. 5D, are preferably woven therein to allow the adhesive to wrap about the structure of the ribbon for improved securement to the outer polyurethane material. While the holes 14E and 72 in FIGS. 5B and 5D are shown as being diamond-shaped and rectangular, any hole configuration could be employed to enhance the securement of the reinforcing ribbon to the outer length of material.

The dual fiber reinforcing ribbon 14 is preferably of a rectangular configuration in cross section and sized such that the transverse dimension thereof is slightly less than the transverse dimension of channel 18 and the thickness or height thereof is slightly less than one-half the height of channel 18. By way of example, in a belt 10 wherein the outer surface 15 is about 0.460 inches wide, the inner surface 16 is about 0.260 inches wide and having a height of about 0.325 inches, a ribbon about 3/16 of an inch wide and about 0.0625 inches in thickness (±0.005 in.) is disposed in a channel 18 measuring about 0.190 inches wide by about 0.125 in. high. The central Kevlar portion 14A of ribbon 14 comprise about fifty percent of the overall width of ribbon 14 and the bordering fiberglass portions 14B each comprising about twenty-five percent of the width of the ribbon. The bottom surface of channel 18 is spaced about 0.090 inches from inner surface 16. The end walls forming channel 18 can be slightly rounded as shown in FIGS. 2–4 to avoid the formation of sharp corners within the belt and thus avoid possible stress risers within the belt.

In belt 10, the outer length of belt material 12 forms a closed loop of any desired size with the extended ends 12' and 12" being in an abutting and mating relationship. Ends 12' and 12" preferably define acute angles with respect to the central axis of belt length 12 and as illustrated in FIG. 4. As a result, when the finished belt is caused to travel in the direction of the point 12A defined by the abutting ends 12' and 12", the mating joint will tend to close, not pull apart as the belt 10 travels over and about the pulleys (not shown).

The reinforcing ribbon 14 is disposed in a flat disposition in a bed of a quick setting adhesive 25 proximate the bottom wall of channel 18 and extends within channel 18 around the entire interior of belt 10 such that the extended ends 14' and 14" of the ribbon 14 abut each other within channel 18. To maximize any imbalance of belt 10, ribbon ends 14' and 14" abut each other directly across the formed loop from the abutting ends 12' and 12" of the outer length of belt material 12. The adhesive 25 is injected into channel 18 during the formation of the belt to secure the reinforcing ribbon to the outer length of belt material 12. A small amount of adhesive can also be applied to the ends 12' and 12" of belt length 12 to secure together the mating ends 12' and 12" of the outer length of belt material in a smooth and continuous joint. It has been found, however, that it is not necessary to the integrity of belt 10 to adhere the mating ends 12' and 12" with adhesive.

The resultant belt 10 with its interior reinforcement is highly durable, heat resistant, well balanced and not susceptible to stretching during use. The polyurethane of which the outer portion of the belt is preferably formed has a high coefficient of friction to reduce slippage during use and is ozone resistant. In addition to providing an improved power transmission belt, belt 10 is particularly adapted to being formed on site as for example by a garage mechanic into any circumferential size for the particular application at hand.

The adhesive 25 originally employed in belt 10 was a two component urethane adhesive which was very flexible upon curing and has a resin to accelerator ratio of 1:1 to facilitate application. Such an adhesive is marketed by Ashland Chemical Company of Columbus, Ohio under the product designation trademark PLIOGRIP 7420. PLIOGRIP 7420 exhibits a 130% elongation factor. Superior results, however, have recently been obtained in tests using a new two component urethane adhesive formulation developed by Ashland Chemical Company which has a 2:1 resin to accelerator ratio and exhibits over a three hundred percent elongation. This new adhesive is designated PLIOGRIP EXP 5840-154/6057-147.

In a new and now preferred form of the present invention, the reinforcing ribbon is braided and sized so as to be only one-half the thickness of ribbon 14, or about 0.030 in. By reducing the thickness of the ribbon and utilizing the new above-identified adhesive having a high elongation factor, the ribbon can be extended twice about the outer length of material within channel 18 without incurring the deleterious effects of work hardening in the adhesive. Because the reinforcing ribbon will better adhere to itself than the polyurethane material which is preferably used in the outer length of belt material 12, the dual wrap improves the loop retention function of the reinforcing ribbon and thus the strength and durability of the belt. Because the reinforcing ribbon in the dual wrap configuration extends twice about the channel 18 in the outer length of material 12 with the extended ends of the ribbon being in an adjacent disposition opposite the adjacent ends 12' and 12" of the outer length of material, the balance in the belt is maintained. While the thickness of the individual adhesive layers is reduced by the addition of a second wrap of reinforcing ribbon and a layer of adhesive between the ribbon wraps, the high elongation factor in the adhesive effectively prevents any work hardening from occurring during use.

Figure 5C:
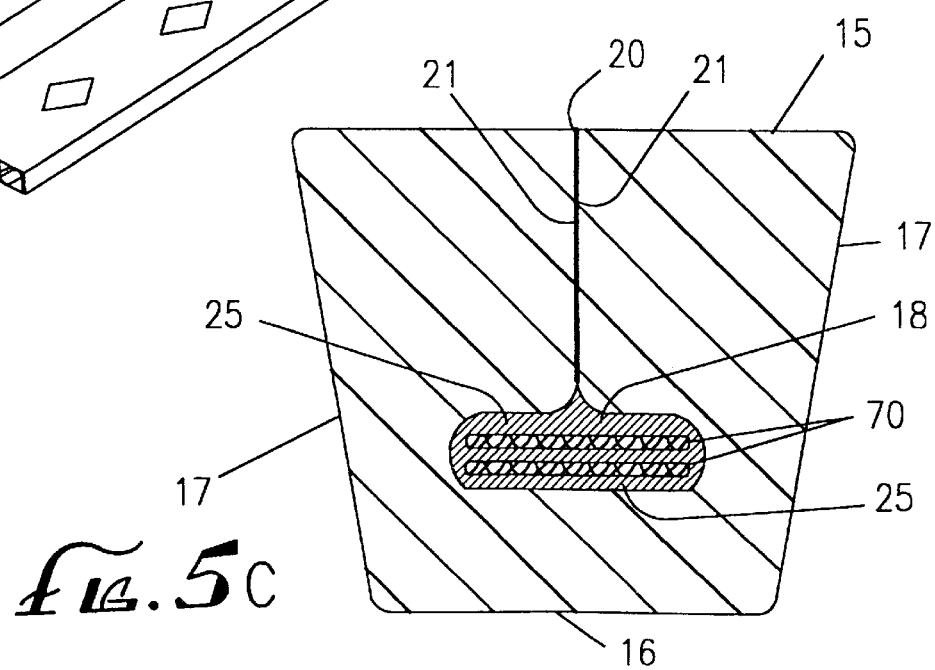
FIG. 5C is a sectional view of another alternate embodiment of the endless belt of the present invention.
Figure 5E:
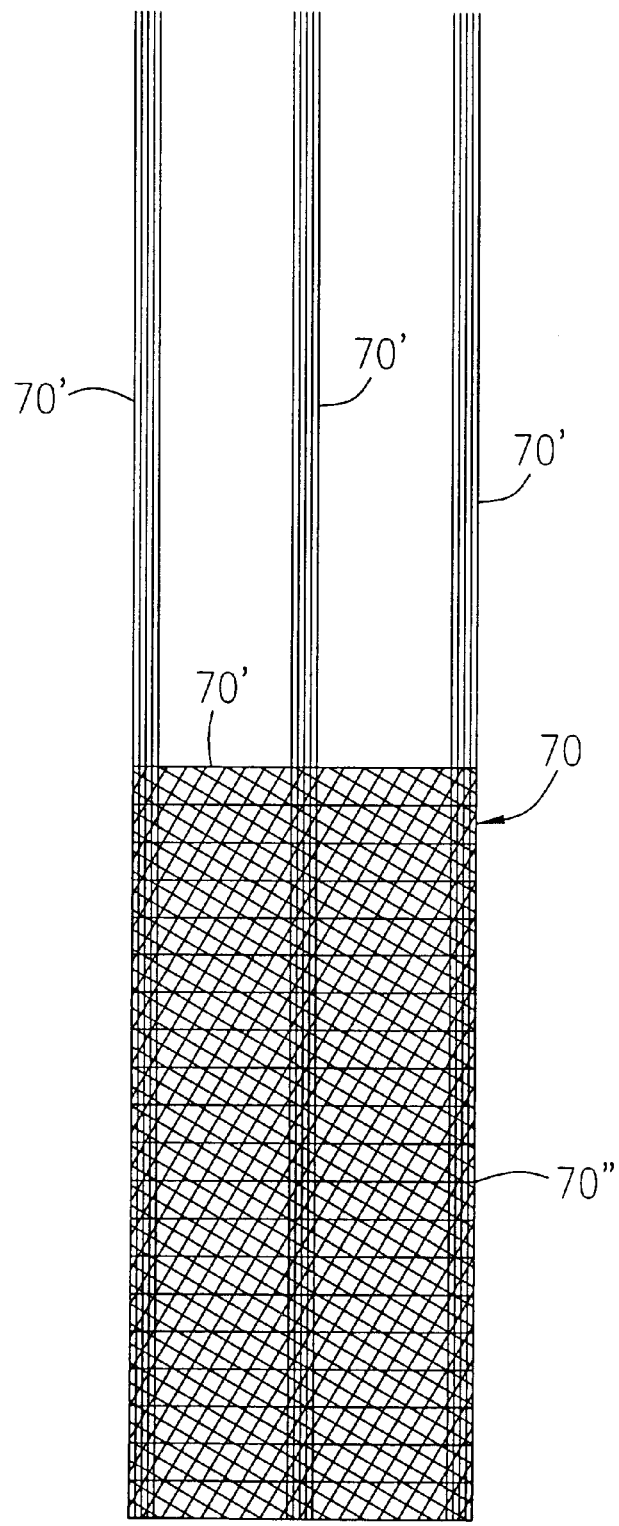
FIG. 5E is an enlarged plan view of the preferred embodiment of dual fiber reinforcing ribbon with a portion of the over-raided fibers removed.
Figure 9:
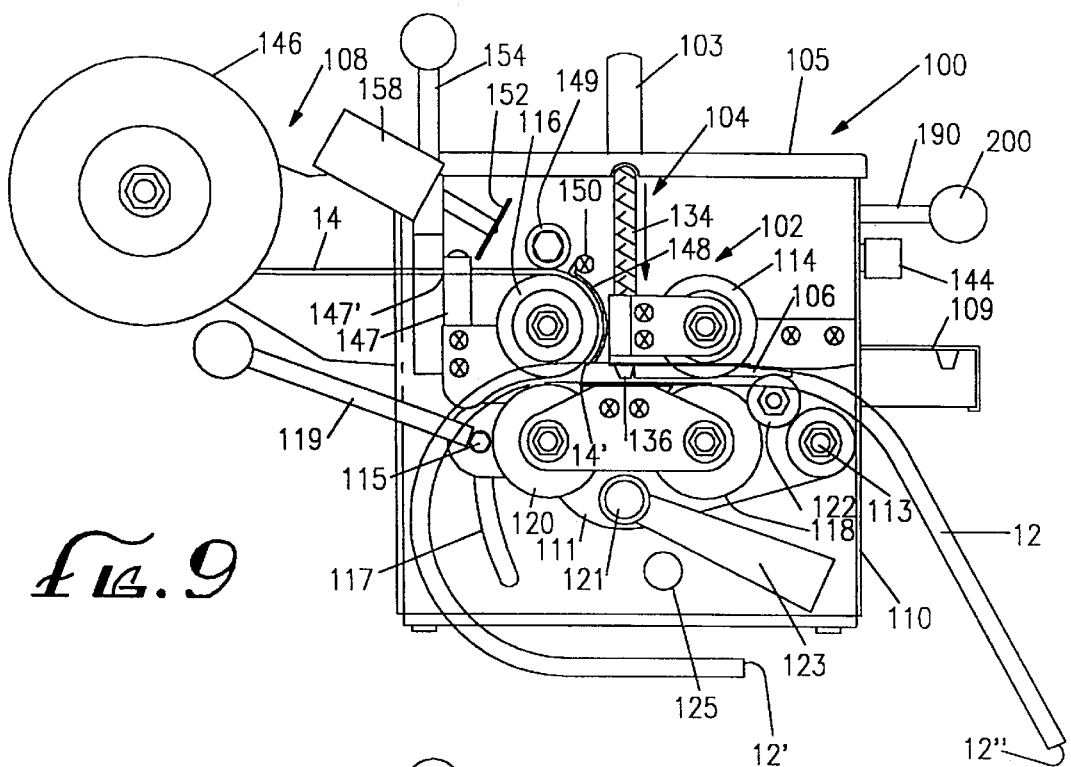

The above-described modified belt construction is illustrated in FIG. 5C. As seen therein, two layers of the thin reinforcing ribbon 70 are provided in channel 18 with layers of adhesive 25 being disposed about each layer of ribbon 70 so as to encapsulate the ribbon within channel 18 as in the previously described embodiments. The reinforcing ribbon 70 employed in the preferred embodiment of the invention is illustrated in FIG. 5E. Ribbon 70 is preferably comprised of three equidistantly spaced tynes 70' of longitudinally disposed high strength fibers which are over-braided with pre-stretched polyester fibers 70". Each of the tynes of high strength fibers is comprised of about twenty to thirty strands of such fibers. The fibers preferably employed in tynes 70' are ultra-high molecular weight fibers marked under the trademark SPECTRAFIBER 1000 by Allied Signal, Inc. of Petersburg, Va. Because the SPECTRAFIBER 1000 fibers are substantially less abrasive than Kevlar, they can be over-braided with the adhesive receptive polyester without cutting the polyester and thus totally encapsulated by the pre-stretched polyester fibers to enhance the surface area of the adhesive absorbing fibers. As a result, superior adhesion of the reinforcing ribbon to itself and to the outer length of belt material is obtained.

The process for forming belt 10 in any desired size can be varied depending on the output needs of the belt former. For example, the outer length of belt material 12 with the interior channel 18 and radial slit 20 formed therein during extrusion can be provided either with the reinforcing ribbon 14 already disposed in channel 18 for manual fabrication or, more preferably, separately from the ribbon for manual and automated fabrication. If provided separately, the outer length of material 12 is first cut to the predetermined length for forming the desired belt size such that the extended ends 12' and 12" define acute mating angles as previously described. The ribbon is then cut to an identical length. The severed outer length of material 12 is then formed into a continuous endless loop as the reinforcing ribbon 14 and adhesive 25 are concurrently inserted into the channel 18 therein.

As the outer length of belt material 12 is directed about a plurality of guide rollers in the formation of length 12 into a closed loop, the side wall portions 21 of slit 20 are temporarily spaced apart to provide access to channel 18 for the insertion therein of the adhesive 25 and reinforcing ribbon 14. The adhesive and reinforcing ribbon are then fed through the widened slit into the interior channel 18 such that the ribbon lies flat within the channel on a layer of adhesive with the leading end 14' of the reinforcing ribbon within channel 18 being located at the midpoint of the outer length of belt material 12. The adhesive feed actually begins slightly before the entry of the ribbon to insure that the leading edge of the ribbon rests in the adhesive. The adhesive and reinforcing ribbon continue to be fed into channel 18 along the length of belt material 12 such that the ribbon lies flat on a bed of adhesive with the adhesive extending about but not encapsulating the entire ribbon.

As the adhesive and ribbon feeds continue and they approach the trailing end 12" of the outer belt length 12, the leading end 12' thereof is brought into abutment with the trailing end 12" to form a closed loop. The adhesive and ribbon continue to be fed into channel 18 such that the adhesive and reinforcing ribbon extend across the abutting ends 12' and 12" of the outer length of belt material 12 until the trailing end 14" of the ribbon is inserted adjacent the leading end 14'. Any wrinkles in the reinforcing ribbon 14 within channel 18 should then be pressed flat and additional adhesive is preferably fed into and about channel 18, filling channel 18 and encapsulating ribbon 14. Any seepage of adhesive 25 through slit 20 should be cleaned off the outer surface 15 of the belt. While not necessary for the structural integrity of the belt, the adjacent belt ends 12' and 12" can be secured together with adhesive by slightly separating ends 12' and 12", applying a small amount of adhesive to the ends, pressing the ends together and holding the ends in a mating relationship while the adhesive sets.

In the formed belt 10, a single layer of the reinforcing ribbon 14 extends uniformly about the entire length of belt material 12, spanning across the abutting ends thereof and is bonded thereto throughout the formed belt, thereby maintaining the formed belt 10 in its endless loop configuration and providing the belt with superior structural integrity and durability.

The process for forming the belt with two layers of reinforcing ribbon extending about the interior of the outer length of material is virtually identical to that described above except that the reinforcing and adhesive feed continues for an additional loop about the channel formed in the outer length of belt material so as to form two wraps of reinforcing ribbon within the formed belt with an additional layer of adhesive being disposed therebetween. In addition, a leading edge portion of the ribbon of about one inch in length is preferably laid in a dry condition on the channel floor so that the ribbon end can be more easily laid flat so that it will not interfere with the overlapping ribbon during the subsequent feeding of the second wrap of ribbon within the channel. The remainder of the belt forming process employed in the dual wrap embodiment is the same as in the above described single wrap process.

One embodiment of an automated belt forming apparatus 100 and the operation thereof to form belt 10 is illustrated in FIGS. 9–18. The portions of the outer length of material 12 passing through the belt former 100 are shown in FIGS. 9–13 as though the belt length were transparent so as to more clearly illustrate the component elements of belt former 100. Belt former 100 comprises a belt guide/drive assembly 102, an adhesive dispensing assembly 104, a slit spreader 106, a reinforcing ribbon feed assembly 108 and a belt clamp 109. The belt drive/guide assembly 102 comprises an electric drive motor (not shown) disposed within the belt former housing 110, a drive gear 112 (see FIG. 14), a pair of driven upper rollers 114 and 116, a pair of driven lower rollers 118 and 120 and a free-wheeling lower belt guide roller 122.

Figure 16:
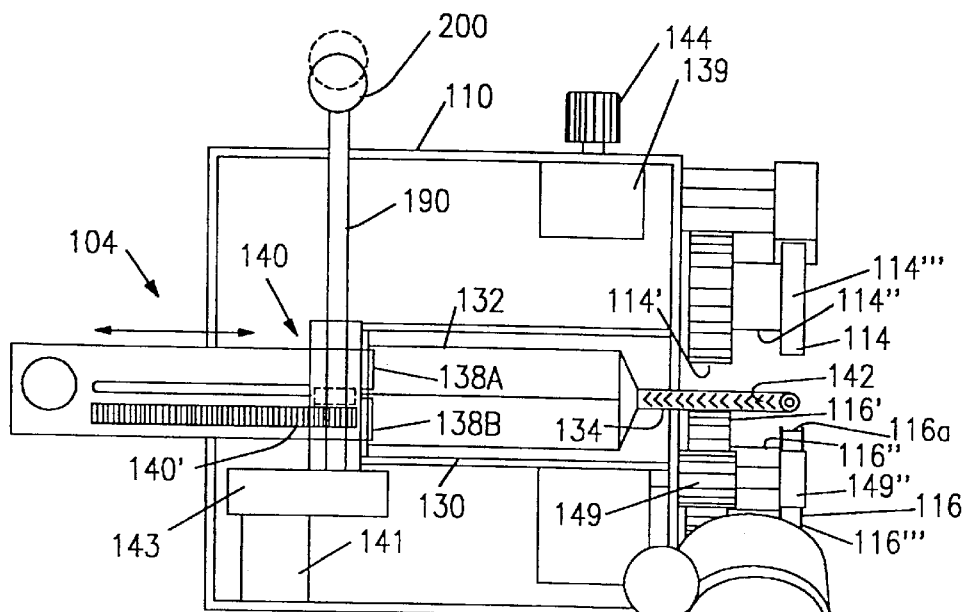
FIG. 16 is a top plan view of a belt forming apparatus employed in the present invention with the cover removed to show the adhesive delivery system employed therein.

As seen in FIG. 16, upper rollers 114 and 116 each comprise an inner gear drive portion 114' and 116', an outwardly projecting cylindrical shoulder 114" and 116", and an outer belt spreader portion 114''' and 116'''. The gear drive and shoulder portions of rollers 114 and 116 are formed of steel and are of single piece construction while the outer spreader portions are preferably formed of a Delrin plastic material and held against and in axial alignment with shoulders 114" and 116" by a bolt member. In use, the belt spreader portions 114''' and 116''' of upper rollers 114 and 116 project into the length of belt material 12 through slit 20 upon the slit being widened by the slit spreader 106 and temporarily maintain the slit in a spread position as the ribbon 14 and/or adhesive 25 are fed into channel 18 as will be described. In addition, upper roller 116 also functions as a ribbon feed roller for directing the reinforcing ribbon 14 into the channel 18 in the outer length of belt material 12 and preferably defines a shallow channel 116a in the circumferential surface of spreader portion 116''', as illustrated in FIG. 16, for aligning the ribbon on roller 116 as will also be described later herein.

The lower rollers 118 and 120 are of the same construction as upper rollers 114 and 116 except that the outer portions thereof (not shown) define belt drive portions which bear against the inner surface 16 of the outer length of belt material 12 and drive the belt length through the belt former 100. The outer belt drive portions of rollers 118 and 120 are thus wider than the spreader portions 114''' and 116''' of the upper rollers and are provided with knurled circumferential surfaces to assist in advancing the belt through the belt former. For fabricating typical automotive fan belts having a transverse dimension across the outer surface of about $11/32$ to $15/32$ inches and wherein the reinforcing ribbon 14 is about $3/16$ inches wide, the belt spreader portions of the upper guide rollers are about 0.02 inches wider than the ribbon or about 0.208 inches wide and the belt drive portions of the lower rollers are about 0.50 inches wide. Guide roller 122 over which the outer length of belt material 12 passes prior to reaching the upper and lower guide rollers 114 and 118, defines inner and outer radial side walls, similar to a conventional pulley, which extend about the outer length of belt material for holding the belt material in line as it enters the belt former 100 between upper and lower rollers 114 and 118. A carrying handle 103 is secured to the upper end plate 105 of the housing 110.

In operation, drive gear 112 engages the inner gear drive portions of the lower rollers 118 and 120 and is driven by the drive motor in a clockwise direction so as to cause the lower rollers 118 and 120 to be rotated counterclockwise. The inner gear drive portions of the lower guide rollers also engage the inner drive portions 114' and 116' of the upper guide rollers 114 and 116 to effect clockwise rotation to the upper rollers.

To enable the completed belt 10 formed on belt former 100 to be removed from former 100, the lower rollers 118, 120 and 122 are carried by a support plate 111 pivotally mounted proximate one end thereof about a bolt shaft 113 (See FIG. 16). Pivotal movement of plate 111 and the guide rollers mounted thereon is controlled by a guide rod 115 which is carried by the other end of plate 111 and projects into and is translatable along an arcuate guide slot 117 in the side wall of the belt former housing 110. A handle 119 is welded to guide rod 115 for pivoting plate 111 from its upper operative position illustrated in FIGS. 9–13 to the lower position illustrated in FIG. 14. A vertically disposed spring (not shown) is provided within housing 110 which is operatively secured at its lower end to guide rod 115 for urging the plate 111 to the upper operative position. To lock the plate 111 in the upper position, a spring-loaded rod 121 having a bushing secured in the inner end thereof (not shown) is carried by plate 111 and biased so as to project into a detent or opening (also not shown) in the housing behind plate 111 and below drive gear 112. A radially disposed a handle 123 is secured to rod 121 to retract the rod and disengage the plate 111 from housing 110. To hold the plate 111 in the lower position to facilitate cleaning of the belt former 100, a similar opening 125 is disposed in the lower portion of the belt former housing. To move plate 111 from the upper locked position to the open position, the operator first pulls outwardly on handle 123 which disengages rod 121 from the former housing and then pulls handle 119 downwardly, bringing the lower portion of the belt drive assembly to the position shown in FIG. 11 where it is again locked in place by rod 121. Subsequent retraction of handle 123, will cause the plate and rollers carried thereby to pivot clockwise about bolt shaft 113 under the force of the spring acting thereon and return the plate to the upper position whereupon the bearing in the end of rod 121 will again engage the belt former housing and lock the plate 111 in the operative position.

Figure 18:
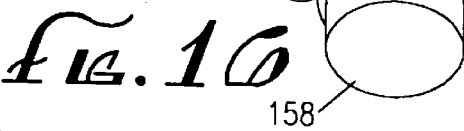
FIG. 18 is a partial exploded view of the connection between the adhesive drive gear motor and the pinion gear in the adhesive feed assembly.
Figure 17:
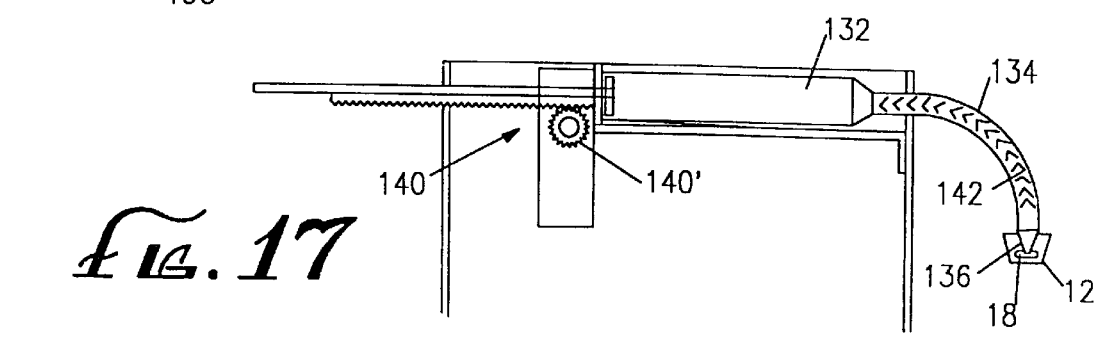
FIG. 17 is a partial side view of a belt forming apparatus employed in the present invention showing the adhesive delivery system.

The adhesive dispensing assembly 104 is shown in FIGS. 16–18 and comprises a horizontally disposed trough 130 mounted in the upper end of the belt former housing 110 for supporting a cartridge 132 of a two component adhesive 25. A feed tube 134 having a tapered nozzle 136 secured to the downstream end thereof is secured to the outlet end of cartridge 132 for directing the adhesive from the cartridge into the channel 18 in the length of belt material 12. A pair of longitudinally movable plungers 138A and 138B are operatively connected by a rack and pinion 140 to a small d.c. gear motor 141 through a planetary gear reduction drive 143 to bear against cartridge 132 and slowly force the adhesive components therefrom. A helix 142 is provided within feed tube 134 to effect mixing of the two adhesive components as they are driven by plungers 138A and 138B through the feed tube. The rate of adhesive feed effected by the linear movement of plungers 138A and 138 can be adjusted by means of a rheostat 139 operatively connected with gear motor 141 and control knob 144 which varies the speed of gear motor 141 and thus the rate of movement of the plungers. Alternatively, a screw-feed mechanism could be employed to dispense the adhesive from cartridge 132, in lieu of the rack and pinion adhesive feed assembly described above.

A supply of reinforcing ribbon 14 is carried by a spool 146 rotatably mounted on the belt forming apparatus 100. The ribbon 14 extends from spool 146 through a guide slot 147' in block 147 between the outer belt spreader portion 116''' of upper roller 116 and the outer ribbon drive portion 149''' of a ribbon drive roller 149 and about the outer belt spreader portion 116''' of upper roller 116 within the guide channel 116a therein. An arcuate guide 148 is secured to the belt former housing at 150 and extends about a portion of the circumferential surface of roller portion 16''' to direct ribbon 14 about roller 116. Ribbon drive roller 149, like rollers 114–120, is provided with gear and shoulder portions with the inner the gear portion thereof engaging gear portion 116' of roller 116 and is driven by gear portion 116'. A circular knife blade 152 for severing the reinforcing ribbon 14 is operatively connected to a control rod 154 and small drive motor 158. By depressing control rod 154, the knife blade 152 is lowered into the path of the reinforcing ribbon along guide bar 160 and the drive motor 158 is activated, causing rotation of blade 152 and severing of the ribbon 14 from the supply thereof on spool 146. An arcuate plexiglass shield (not shown) is preferably disposed about blade 152 for safety purposes.

To form belt 10 using belt former 100, the outer length of belt material 12 is first cut to the desired length such that the extended ends 12' and 12" define the above-described mating pointed surfaces illustrated in FIG. 4. A guillotine-type knife is preferably employed to make the desired end cuts. The leading end 14' of the reinforcing ribbon projecting from spool 146 is positioned between the outer belt drive portion 116''' of roller 116 and the corresponding portion 149''' of ribbon drive roller 149. The drive motor of the belt former 100 is activated with plate 111 preferably in the lowered position. Upon pulling rod 121 from opening 125, the spring within the belt former housing 110 pulls plate 111 to the upper operative position where rod 121 again locks plate 111 in place and the gear portions of rotating lower rollers 118 and 120 mesh with the gear positions of rollers 114 and 116. The ribbon then begins to be drawn by rollers 116 and 149 about portion 116''' of roller 116 and is held against roller 116 by arcuate guide 148.

Upon activation of the drive motor, the cut length of belt material 12 is inserted into the belt former 100 such that length 12 passes over guide roller 122, the tapered end 106' of the slit spreader blade 106 projects longitudinally into the slit 20 at the leading end 12' of the belt length 12, and is fed forwardly until the leading edge 12' thereof is disposed between the counter-rotating outer belt drive portions 114''' and 118''' of the upper and lower rollers 114 and 118. As the belt length 12 is fed forwardly, the spreader blade 106 opens slit 20, forcing apart side wall portions 21. The inner surface 16 of belt length 12 contacts the outer drive portion of roller 118 and the outer spreader portion 114''' of upper roller 114 is disposed adjacent the leading edge of channel 18. The rotating drive roller 118 then advances the belt length 12 to the start-up position illustrated in FIG. 9 and the drive motor is deactivated. At the start up position, the outer belt length 12 has been advanced such that its mid point is disposed slightly behind the adhesive feeder tube 134. As the belt length 12 is moved to the start-up position, the spreader bar 106 holds the slit 20 in the open position to receive the outer spreader portion 114''' of roller 114 which then projects into channel 18 and in turn holds the slit open to receive the nozzle 136 on the adhesive feeder tube 134 which also projects into channel 18 as seen in FIG. 6. The gear motor 141 is then activated to begin the adhesive feed. The movement of the adhesive from cartridge 132 to nozzle 136 can be accelerated by knob 144 and subsequently adjusted to provide the desired adhesive feed rate. The drive motor remains deactivated after activation of motor 141, stopping the belt travel while the adhesive flows through the feed tube 134 to nozzle 136.

Figure 10:
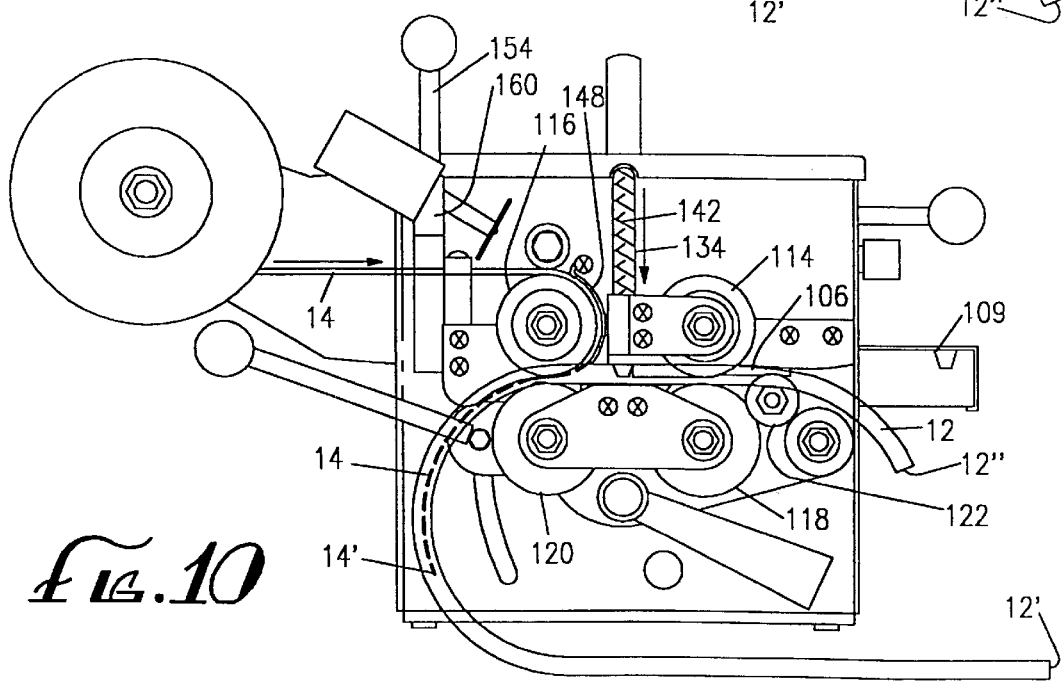

As soon as the adhesive 25 begins flowing into channel 18, the drive motor is again activated and the rotating upper and lower rollers 114–120 cause the belt length 12 again to move from right to left as seen in the drawings with the outer belt drive portions of rollers 118 and 120 abutting the inner surface 16 of the belt length and providing the driving force while the outer belt spreader portions 114''' and 116''' of rollers 114 and 116 extend through slit 20 between the separated side walls 21 thereof to the upper portion of channel 18, temporarily opening slit 20 to receive the adhesive and ribbon and providing surfaces against which the lower drive rollers 118 and 120 can press the belt length 12 to drive the belt length through the belt former 100. Reactivation of the drive motor also causes rollers 116 and 149 to draw the reinforcing ribbon 14 about roller 116 as adhesive 25 is forced into channel 18 through nozzle 136 by the moving plungers 138A and 138B. Roller 116 directs the ribbon into channel 18 in a flat disposition onto the thin layer of adhesive just deposited therein. The leading edge of the reinforcing ribbon is drawn into the channel 18 in belt length 12 at the mid point thereof to balance the formed belt as will be described. As the length of belt material 12 continues past the adhesive feed nozzle 134 and roller 116, the adhesive continues to be injected into channel 18 followed by the reinforcing ribbon which is deposited in the adhesive. This stage of the belt forming operation is illustrated in FIG. 10. The reinforcing ribbon 14 is shown in FIGS. 10–13 in dotted lines within the outer length of belt material 12. (The adhesive deposited adjacent the ribbon within the outer belt material is not separately shown in those figures to avoid cluttering the figures.) Because the outer spreader portions of upper rollers 114 and 116 project through and widen slit 20 to provide access to channel, it is important that they only spread the side walls 21 of slit 20 apart a distance slightly greater than the width of the reinforcing ribbon 14 so as not to stretch the outer length of belt material 12 beyond its elastic limit. By sizing the spreader portions 114''' and 116''' of the upper rollers such that they are only about 0.02 inches wider than the reinforcing ribbon, the inherent resilience in the belt material will quickly close sift over ribbon 14 as the belt length 12 is moved past roller 116, preventing slippage of the ribbon with respect to the belt length 12. In addition, to prevent bunching of ribbon 14 within channel 18, it is important that the ribbon be fed into channel 18 in a taut disposition. Any bunching of the ribbon within the formed belt 10 would create slack in the ribbon within the finished belt and allow the outer length of material 12 to stretch during use which, of course, is undesirable. To avoid such a condition, the diameter of the spreader portion 116''' of roller 116, which also functions as a ribbon feed roller, is made slightly smaller than the diameter of the spreader 114''' of roller 114, reducing the surface speed of roller portion 116''' relative to that of roller portion 14'''. As a result, the rate at which the reinforcing ribbon is drawn into the channel 18 in belt length 12 is reduced slightly relative to the spread at which the belt length 12 is moved so that it is fed into channel 18 in a taut disposition. With the spreader portion of roller 114 defining a diameter of 1.930 inches, a reduction in the diameter of the spreader portion of roller 116 of about 0.050 inches will provide the desired result. By comparison, the drive portions of the lower rollers are 1.970 inches in diameter and the gear portions of rollers 114–120 are each 2.0 inches in diameter and have an equal number of gear teeth.

Figure 11:
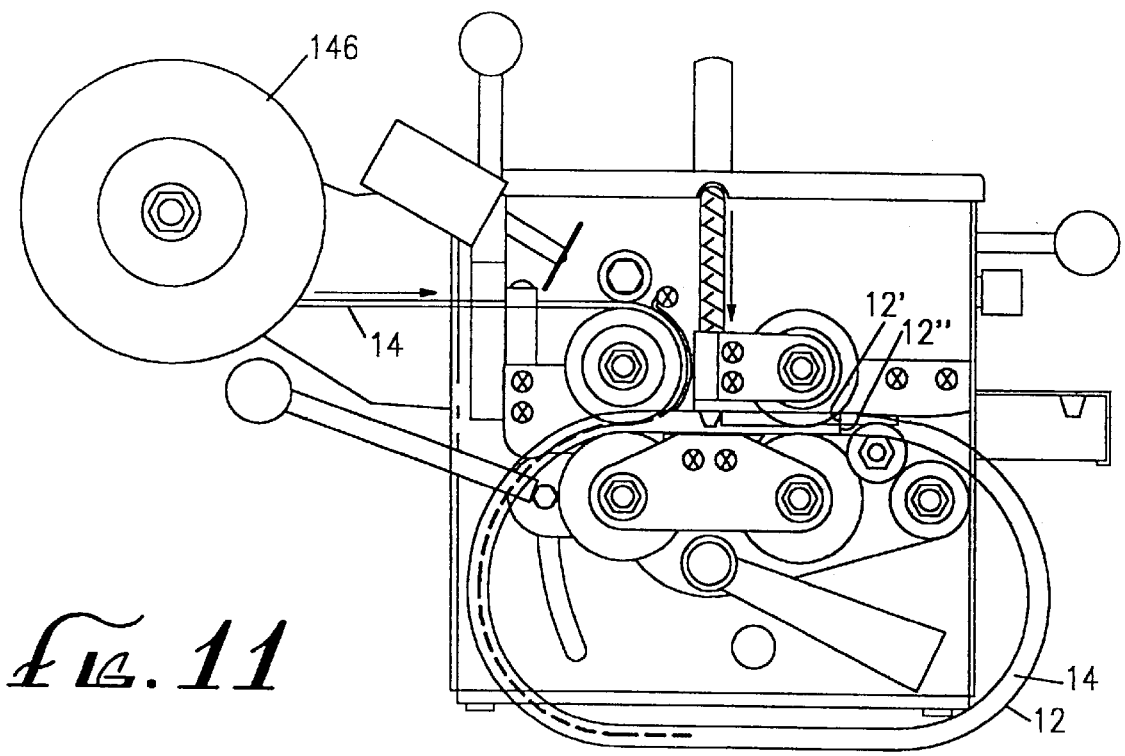
Figure 12:
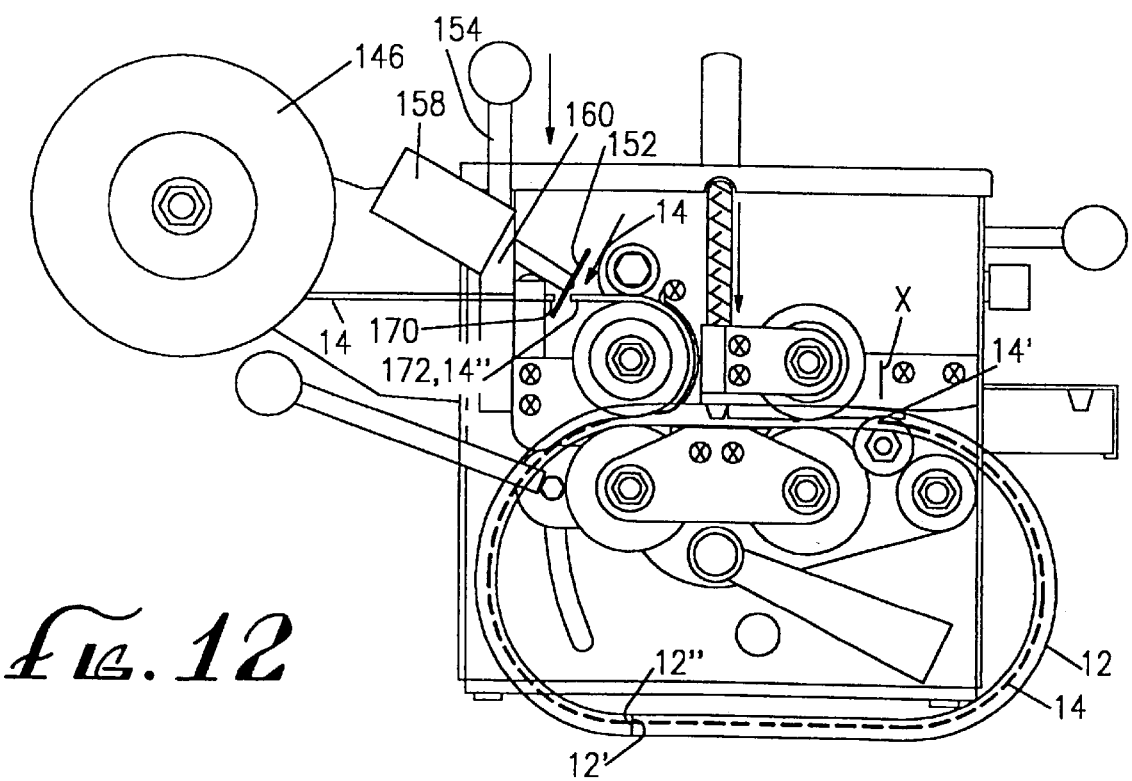
Figure 15:
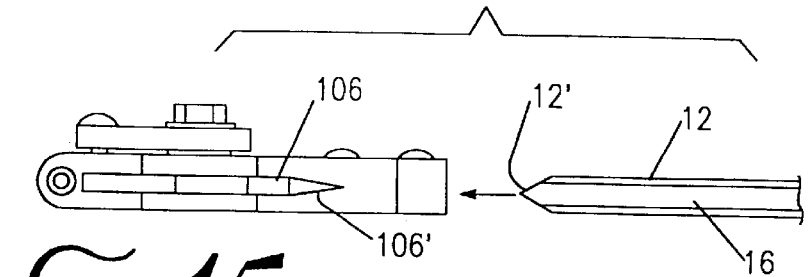
FIG. 15 is a partial bottom plan view of a belt forming apparatus employed in the present invention showing the belt channel spreading device employed therein.

When the trailing edge 12'' of belt length 12 approaches upper and lower rollers 114 and 118, the operator takes the leading edge 12' of belt length 12 and positions the leading edge adjacent the trailing edge 12'' thereof such that the leading edge is fed back into the belt former 100 between rollers 122, 114 and 118 to form a closed loop. This position is illustrated in FIG. 11. The operator then allows the drive rollers 118 and 120 to continue to move the formed loop of belt material 12 and reinforcing ribbon 14 through the belt former 100. As the adjacently disposed ends 12' and 12'' of belt length 12 move past the adhesive feed tube 134 and upper and lower rollers 116 and 120, the reinforcing ribbon is continuously inserted into channel 18, extending across the adjacent ends 12' and 12'' of belt length 12 and overlapping itself within channel 18. When the leading edge 14' of the reinforcing ribbon 14 in channel 18 reaches a predetermined location relative to the belt former 100 (designated X in FIG. 12) which is approximately two inches from the nozzle 136 on the adhesive feed tube 134, the ribbon knife blade 152 is activated by control rod 154 to sever the reinforcing ribbon at 170 as shown in FIG. 12. The trailing end portion 172 of the reinforcing ribbon is the forced into channel 18 with the extended end 14'' of ribbon 14 being disposed adjacent the leading end 14'. The drive motor is then allowed to advance the formed belt (see FIG. 13) until the belt has been driven an additional one full turn about the adhesive feed tube 134 so as to flatten the reinforcing ribbon within the channel 18 and fill the channel with adhesive so as to encapsulate the ribbon within the adhesive throughout the length of the belt 10. The formed belt 10 is then removed from the belt former 100 by pivoting the plate 111 and then rollers 122, 118 and 120 carried thereby to the lower position by means of handles 119 and 123 as earlier described and illustrated in FIG. 14. The adjacent ends 12' and 12'' of belt length 12 are then manually pulled slightly apart, a small amount of adhesive is applied to the extended ends, any seepage of adhesive through slit 21 is wiped off and the ends 12' and 12'' are manually fixed in the aligned mating relationship.

The formed loop is then placed in a clamp to hold ends 12' and 12'' together on the adhesive sets. A belt clamp 109 is mounted on the side on the belt forming housing and includes a lower support block 182 and a pivotally mounted top pressing plate 184. Block 182 has a cavity 185 formed therein having the same cross-section configuration as belt 10. By raising pressing plate 184 and inserting the adjacent matting ends 12' and 12'' of the formed belt within the cavity 185 in the support block and lowering the plate into the locked position as seen in FIG. 14, the adjacent ends of the belt are firmly held in matting alignment. The belt is allowed to remain within the clamp for about three minutes while the adhesive 25 within the belt cures, completing the formation of belt 10.

To enable the operator to retract plungers 138A and 138B after formation of belt 10, a suitable mechanism is provided for disengaging the rack and pinion 140 as the gear motor 141 would otherwise prevent retraction of the plungers. Such a mechanism is illustrated in FIG. 18. The pinion gear 140' is mounted on a rod 190 provided with a cylindrical axial channel 192 in its extended end portion and a transverse slot 194 extending across the end thereof. The gear motor drive shaft 196 defines a reduced diameter portion 198 adjacent the end thereof which extends into channel 192 in rod 190. A pin 199 extends transversely through and is affixed to the reduced diameter portion of the drive shaft. Pin 199 projects radially through slot 194 and thus forms an interlock between the drive shaft 196 and rod 190 on which the pinion gear 140' is affixed. Rotation of the gear motor drive shaft is thus imparted to rod 190 and pinion gear 140' by this interlock. When the gear motor is not activated, retraction of rod 190 by means of gripping knob 200 causes the pinion gear to be pulled from the rack and the slotted end of rod 140 from pin 199, whereupon the plungers can be easily retracted for removal of the adhesive cartridge.

The belt forming apparatus 100 could also be used to form the modified belt design illustrated in FIGS. 5C and 5D wherein the reinforcing ribbon 14 extends twice about the outer length of material 12. To effect such a construction, the operator simply allows the drive rollers 118 and 120 to move the formed loop of belt material and reinforcing ribbon an additional lap about the belt former while the ribbon and adhesive continue to be fed into channel 18 above the previously laid ribbon so that a layer of adhesive is deposited on the previously laid layer of ribbon and a second layer of ribbon is laid on the adhesive. The channel is then filled with adhesive as in the prior embodiment so as to encapsulate the two layers of ribbon on the adhesive as seen in FIG. 5C.

It is to be understood that the various components of the belt forming apparatus 100 could be modified and other apparatus developed for forming belt 10 of the present invention in an automated or semi-automated manner. For example, the lower rollers 118, 120 and 122 could be removably mounted in a modular assembly so that wider rollers could be substituted therefor for use in forming belts of different widths of configurations such as the wider serpentine or V-ribbed belts. The configuration of the outer length of material 312 used in the formation of such a belt is illustrated in FIG. 6. The ribbon (not shown) to be inserted in the generally rectangular channel 318 in the outer belt length 312 is similar to reinforcing ribbon 14 in the conventional fan belt configuration, only considerably wider. One or two wraps of the reinforcing ribbon could be employed. Because V-ribbed belts are generally larger than belt configurations previously discussed and generally used under greater tension, any imbalance created by overlapping positions of reinforcing ribbon within the channel 318 in the outer length of belt material 312 would be relatively insignificant. Accordingly, the larger V-ribbed belts could be formed using a single wrap of reinforcing ribbon having overlapping end portions. A typical ribbon size for use in V-ribbed belts would be 0.750 inches wide by 0.030 inches thick and preferably contain four longitudinal tynes of high strength fibers as opposed to three in the narrower ribbon 70 shown in FIG. 5E. The ribbon is disposed in channel 318 which measures about 0.680 inches wide by about 0.050 inches high. The outer length of belt material is about 0.840 inches wide by 0.336 inches thick. As seen in FIG. 6, the slit 320 preferably would be of a step configuration so as to form overlapping flaps 321A and 321B to facilitate the extrusion of the outer length of material 312.

Additional alternative embodiments of belt 10 are illustrated in FIGS. 3 and 7. FIG. 3 illustrates a variation of the present invention wherein the outer length of belt material 250 is formed by extrusion with a plurality of reinforcing cords 252 extending longitudinally therethrough for unusual applications requiring an exceptionally strong belt. Cords 252 could be formed of Kevlar or another strong, yet flexible material. FIG. 3 also illustrated a separate modification to the outer length of belt material wherein a nylon webbing 256 is formed in the lower surface 258 of channel 18. Webbing 256 would be embedded in surface 258 during the extrusion of the outer belt length 250 and would partially project into the channel so as to provide surfaces within channel 18 to which the adhesive 25 might more readily attach than merely the smooth channel walls. It has been found, however, that successful product can be made utilizing the above-described dual fiber reinforcing ribbon 14 without the need for the additional webbing. It is to be understood that the use of the webbing 256 and reinforcing cords 250 illustrated in FIG. 3 could be employed separately from each other and are illustrated in the same drawing for illustrative purposes only.

FIG. 7 illustrates yet another alternative configuration of belt 10 wherein the outer length of material is of a substantially cylindrical configuration for the manufacture of endless fractional belts for non-automotive applications. Various other changes and modifications may be made in carrying out the present invention without departing from the spirit and scope thereof. Insofar as these changes and modifications are within the purview of the appended claims, they are considered as part of the present invention.

I claim:

1. An endless belt for use in power transmission comprising an outer length of flexible tear-resistant material having mating extended ends so as to form a closed loop and defining an endless channel extending longitudinally therethrough, an inelastic enforcing ribbon of a flexible tear-resistant material disposed within said channel, said ribbon defining first and second ends and extending across said mating ends of said outer length of material and twice about said loop defined by said outer length of material so as to define two layers of reinforcing ribbon within said outer length of material, said first end of said ribbon being disposed adjacent to said second end thereof and an adhesive disposed within said channel about said layers of ribbon and securing together said layers of ribbon and securing said ribbon to said outer length of material to maintain said outer length of material in said closed loop.

2. The endless belt of claim 1 wherein said ribbon is of a braided construction and comprised of a highly durable and inelastic material encased in an adhesive cooperative outer material.

3. The endless belt of claim 1 wherein said ribbon is of a braided construction and comprised of at least two different materials, one of said materials being highly durable and inelastic, a second of said materials being substantially more cooperative with said adhesive than said first material and being braided about said first material for securing said ribbon together and to said outer length of material.

4. The endless belt of claim 1 wherein said adhesive exhibits an elongation factor of over three hundred percent.

5. The endless belt of claim 4 wherein said adhesive exhibits and elongation factor of over three hundred percent.

6. A belt assembly for forming an endless belt of a desired size for use in power transmission, said assembly comprising:

an outer length of flexible tear-resistant material defining an outer surface, an inner surface, a first end, a second end, an interior channel extending longitudinally therethrough, and a slit extending the length thereof from said outer surface to said channel;

an adhesive adapted to be injected through said slit into said channel throughout the length thereof; and an inelastic reinforcing ribbon formed of a flexible tear-resistant material adapted to be inserted into said channel through said slit such that upon injecting said adhesive into and along said channel, placing said ends of said outer length of material in an abutting relationship and drawing said ribbon into said channel through said slit and about said outer length of material so that the ends of said ribbon are disposed in an adjacent position substantially equidistantly between said ends of said outer length of material and said ribbon extends in a flat disposition within said channel twice about said outer length of material and across the abutting ends thereof so as to define two layers of reinforcing ribbon within said adhesive in said channel, said ribbon is secured together and to said outer length of material by said adhesive, defining a continuous belt of uniform construction.

7. The endless belt of claim 6 wherein said ribbon is of a braided construction and comprised of at least two different materials, one of said materials being highly durable and inelastic, a second of said materials being substantially more cooperative with said adhesive than said first material and being braided about said first material for securing said ribbon together and to said outer length of material.

8. A belt assembly for forming an endless belt of a desired size for use in power transmission, said assembly comprising:

an outer length of flexible tear-resistant material defining an outer surface, an inner surface, a first end, a second end, an interior channel extending longitudinally therethrough, and a slit extending the length thereof from said outer surface to said channel;

an adhesive adapted to be injected through said slit into said channel throughout the length thereof; and an inelastic reinforcing ribbon comprised of a highly durable and inelastic inner portion and a relatively non-abrasive and adhesivie cooperative outer portion, said ribbon being adapted to be inserted into said channel through said slit such that upon injecting said adhesive into and along said channel, placing said ends of said outer length of material in an abutting relationship and drawing said ribbon about said outer length of material and into said channel through said slit so that the ends of said ribbon are disposed in an adjacent position substantially equidistantly between said ends of said outer length of material and said ribbon extends in a flat disposition within said channel about said outer length of material and across the abutting ends thereof within said adhesive, said ribbon is secured to said outer length of material by said adhesive, defining a continuous belt of uniform construction.

9. An endless belt for use in power transmission comprising an outer length of flexible tear-resistant material having mating extended ends so as to form a closed loop and defining an endless channel extending longitudinally therethrough, an inelastic reinforcing ribbon of a flexible tear-resistant material disposed within said channel and extending about said loop defined by said outer length of material, said ribbon defining first and second end portions and extending across said mating ends of said outer length of material with said first end portion of said ribbon overlapping said second end portion thereof, and an adhesive disposed within said channel about said ribbon securing together said end portions of said ribbon to maintain said outer length of material in said closed loop.

10. The belt of claim 9 wherein the mating ends of said outer length of flexible tear-resistant material define a first location on said closed loop and said first end portion of said reinforcing ribbon overlaps said second end portion thereof along a second location on said closed loop, said first location being substantially diametrically opposed across said loop from said second location.

11. The endless belt of claim 9 wherein said ribbon is comprised of a highly durable and inelastic inner portion and a relatively non-abrasive and adhesive cooperative outer portion.

12. The endless belt of claim 9 wherein said ribbon is of a braided construction and comprised of at least two different materials, one of said materials being highly durable and inelastic, a second of said materials being substantially more cooperative with said adhesive than said first material and being braided about said first material for securing said ribbon to said outer length of material.

13. An endless belt for use in power transmission comprising an outer length of flexible tear-resistant material having mating extended ends and forming a closed loop, said length of material defining an endless channel extending longitudinally therethrough, an inner surface, and outer surface, and a slit extending the length of said channel between said channel and said outer surface, an inelastic reinforcing ribbon of a flexible tear-resistant material disposed within said channel and extending about said loop defined by said outer length of material, said ribbon defining first and second end portions and extending across said mating ends of said outer length of material with said first end portion of said ribbon overlapping said second end portion thereof, and an adhesive disposed within said channel about said ribbon securing together said end portions of said ribbon to maintain said outer length of material in said closed loop.

14. The endless belt of claim 13 wherein the mating ends of said outer length of flexible tear-resistant material define a first location on said closed loop and said first end portion of said reinforcing ribbon overlaps said second end portion thereof along a second location on said closed loop, said first location being substantially diametrically opposed across said loop from said second location.

15. The endless belt of claim 13 wherein said ribbon is comprised of a highly durable and inelastic inner portion and a relatively non-abrasive and adhesive cooperative outer portion.

16. The endless belt of claim 13 wherein said ribbon is of a braided construction and comprised of at least two different materials, one of said materials being highly durable and inelastic, a second of said materials being substantially more cooperative with said adhesive than said first material and being braided about said first material for securing said ribbon to said outer length of material.

* * * * *